1,826,879

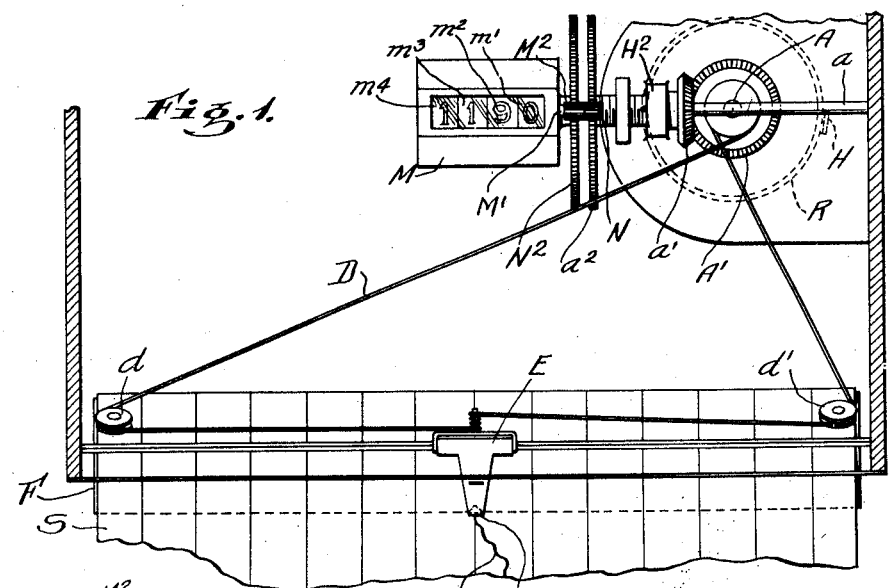
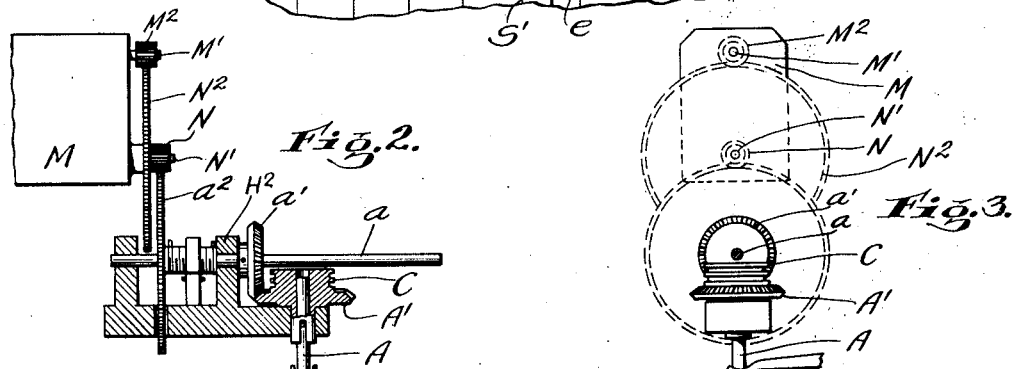
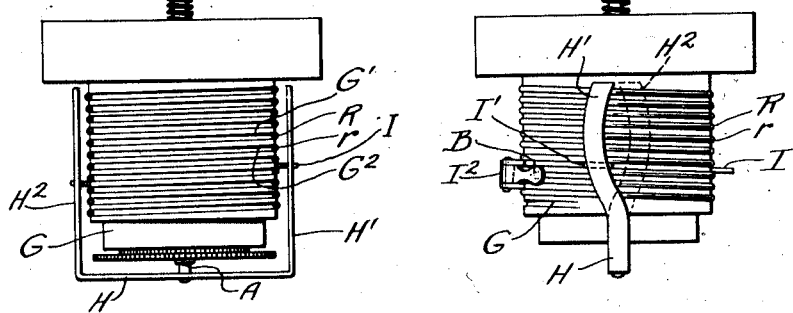
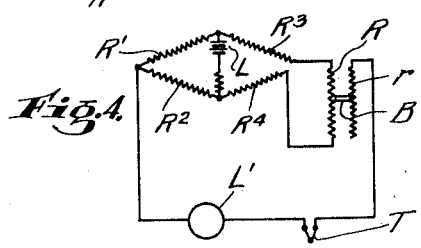
INVENTOR.
THOMAS R. HARRISON
BY John E. Hubbell
ATTORNEY Patented Oct. 13, 1931

UNITED STATES PATENT OFFICE

THOMAS R. HARRISON, OF WYNCOTE, PENNSYLVANIA, ASSIGNOR TO THE BROWN INSTRUMENT COMPANY, OF PHILADELPHIA, PENNSYLVANIA, A CORPORATION OF PENNSYLVANIA

ELECTRIC MEASURING INSTRUMENT

Application filed February 6, 1929. Serial No. 337,786.

My present invention relates to electric measuring instruments, such as potentiometer and Wheatstone bridge instruments, in which the position of a contact along the length of an elongated resistance element, with which the contact is in sliding engagement, constitutes a measure of the quantity measured. Such instruments are essentially instruments of precision used to measure quantitative changes which ordinarily are very small. For example, in a potentiometer used for measuring furnace temperatures, the full scale deflection of the instrument may correspond to a temperature range of 2000° or 2500°, and the use of the instrument may make it desirable to measure a temperature variation as small as one degree or even as small as a fraction of one degree. Heretofore measuring instruments of the character referred to, have been provided with an index movable along a scale, and frequently, also, with a marking element movable over a ruled record sheet to thereby record the value of the quantity measured. With such ordinary scale or ruled record chart provisions it is practically impossible to read increments of the full range movement of the marker or index over the record sheet or scale which are anything like as small as one twenty-five hundredth part of the full scale range of the instrument. The difficulty referred to has led to the commercial use in some cases of such an elongated spiral scale as shown in the patent to Brown, Frey & Wagner No. 1,320,120 of October 28, 1919. Such a spiral scale ordinarily must be made by hand for each individual instrument after the latter is initially calibrated, and its production is a time consuming operation involving considerable expense. The use of such a scale adds complication to the measuring instrument in which it is employed, and such a scale is not well adapted for use in many instruments in which an accurate measurement of small increments of movement of the contact is highly desirable.

The general object of the present invention is to provide an instrument of the type described with simple, effective and relatively inexpensive means, for accurately and precisely showing minute changes in the position of the contact relative to the resistance along which the contact is movable. To this end I combine an ordinary reversible counting train with the mechanism for adjusting the instrument contact along the resistance with which it is in contact, so that the position of the counting wheels of the counting train at any instant will indicate the then position of the contact relative to the resistance. With this arrangement I am able to secure an accuracy in measurement not practically possible of attainment heretofore in many instruments of precision with which the present invention may be advantageously employed, and which it has been possible to approximate heretofore in other instruments only by the use of more complicated and expensive provisions.

The various features of novelty which characterize my invention are pointed out with particularity in the claims annexed to and forming a part of this specification. For a better understanding of the invention, however, and the advantages possessed by it, reference should be had to the accompanying drawings and descriptive matter in which I have illustrated and described preferred embodiments of the invention.

Of the drawings:—

Fig. 1 is a diagrammatic representation of a portion of a recording potentiometer embodying the present invention;

Fig. 2 is an elevation of a portion of the apparatus shown in Fig. 1, with parts broken away and in section;

Fig. 3 is an elevation taken at right angles to Fig. 2; and

Fig. 4 is a diagram of the measuring circuit arrangement of the apparatus shown in Figs. 1, 2 and 3.

In the drawings I have illustrated the use of the present invention in a recording potentiometer instrument comprising a shaft A which is rotatable to adjust a contact B longitudinally along a main potentiometer "slide wire" resistance R, as required to balance a potentiometer measuring circuit. As shown, the shaft A carries a cable drum C giving motion to the cable D wrapped about the drum C and running over idler rolls $d$ and $d'$. The cable C is connected to, and gives movements to a marking element E along a line parallel to the plane including the axes of the pulleys $d$ and $d'$. The carriage E carries a marking pen or pencil $e$ tracing a record S' on a record sheet S, the latter being advanced in the usual manner by a feed roll F.

As shown, the potentiometer resistance R is a closely wound helical conductor, the helical conductor itself being wound in a helix about a stationary cylindrical support G formed with a helical groove in which the helical conductor R is partially received. As shown, also, a second helically wound conductor $r$ is arranged alongside the resistance R, being partially received in a helical groove $G^2$ formed alongside the groove G'. The contact B is a bridging contact connecting the resistances R and $r$, and is moved helically about the axis of the support G to different positions along the helical conductors R and $r$, by the rotation of the shaft A.

The operating connections through which the rotation of the shaft A gives a helical movement to the contact B, comprise a yoke-shaped member H secured to the lower end of the shaft A and having uprising arms H' and $H^2$ which pass through and are slidingly received in notches I' formed in diametrically opposed portions of a contact carrier I. The latter, in the particular form shown, comprises a ring of bakelite or other suitable material which is severed at one side, and which has its severed ends spread apart and connected to opposite sides of a block $I^2$ of insulating material to which the bridge contact B is secured. With the particular arrangement described, the carrier I is in effect a nut having a single thread, which is threaded onto the screw body formed by the support G. The resistances R and $r$, form parallel helical threads on said threaded body between which the carrier ring is guided as said ring is rotated about the axis of the support G against the periphery of which the inner edge of the severed ring bears. Ordinarily in a measuring instrument including a slide wire resistance, the relation between a change in the quantity measured and the corresponding required adjustment of the slide wire resistance and the cooperating contact movable along the resistance, is not a straight line relation, at least throughout the full range of change and adjustment. In accordance with the present invention, I employ rectifying provisions which ordinarily comprise a relatively movable cam and cam engaging part in the operating connections by which the counting train is moved in correspondence with relative movements of the contact and slide wire resistance, so that the counting train actuation is in linear proportion to the change in the quantity, and not to the movement of the contact relative to the slide wire resistance.

While for most uses such rectifying provisions are essential to the exhibition of the relative movement of a slide wire resistance and its cooperating contact by means of a counting train, such rectifying provisions are not absolutely essential in instruments in which the relative movement of the slide wire and its cooperating contact are exhibited by means of an index movable relative to a scale, since the scale markings can be specially graduated. However, the same rectifying provisions employed in an instrument including a counting train may advantageously be employed in an instrument in which the relative movements of a slide wire resistance and its contact are exhibited by the movements of an index along a scale, as in such case the distance between the scale markings on the scale may be equally spaced, whereas without such provisions, the scale markings must be unequally spaced.

In the use of the apparatus shown in Figs. 1 to 3, which is illustrated in Fig. 4, the main potentiometer slide wire resistance R forms part of a bridge circuit including resistances R' and $R^2$, each having one end connected to the corresponding end of the other. The opposite end of the resistance R' is connected by a resistance $R^3$ to one end of the slide wire R, and the opposite end of the resistance $R^2$ is connected by a resistance $R^4$ to the second end of the resistance R. The resistances R' and $R^2$ form the first and second arms of the bridge. The resistance $R^3$ and the portion of the resistance R between the resistance $R^3$ and the contact B form the third arm of the bridge, and the fourth arm of the bridge is formed by the resistance $R^4$ and the portion of the resistance R between the resistance $R^4$ and the contact B. The bridge is energized by a source of current L having one terminal connected to the junction of the resistances R' and $R^3$ and having its other terminal connected to the junction of the resistances $R^2$ and $R^4$. As shown, one terminal of the resistance $r$ is connected to one terminal of the source of E. M. F. to be measured, shown as a thermo-couple T, and the other terminal of the thermo-couple is connected to the junction between the first and second arms R' and $R^2$ of the bridge through the galvanometer L.

With the bridge suitably calibrated, the position of the contact B along the slide wire resistance R is a measure of the E. M. F. generated by the thermo-couple T, when the contact B is adjusted into the position in which there is no current flow through the windings of the galvanometer L. The intended purpose of the resistance $r$ in the apparatus shown, is to substantially neutralize the changes in the resistance in the circuit of the galvanometer L, and consequent changes in galvanometer sensitivity, which the adjustment of the contact B along the slide wire resistance R tends to produce. As shown, the shaft A is rotated to thereby adjust the position of the contact B by means of a shaft $a$, transverse to the shaft A and connected to the latter by bevel gears $a'$ and $A'$.

In so far as above described, the apparatus shown contains nothing now novel with me, but has been illustrated merely as a typical example of a potentiometer instrument with which the present invention may advantageously be employed. The apparatus shown in Figs. 1 to 4 does include certain novel potentiometer instrument features devised by me, and disclosed and claimed in my prior application Serial No. 322,269, filed November 27, 1928, but those skilled in the art will understand that the general features of the present invention are not restricted to use in an instrument of the special form illustrated in my said prior application although well adapted to such use.

As those skilled in the art will understand, the shaft $a$ may be rotated to re-balance the potentiometer either manually or automatically, when deflections of the galvanometer L indicate the need for such a re-balancing adjustment. A desirable form of mechanism for automatically so rotating the shaft $a$ is disclosed in my said prior application Serial No. 322,269, but no necessity for illustrating such mechanism herein exists, both because other mechanisms suitable for the purpose are known to those skilled in the art, and because, as has already been explained, the present invention may be used with a potentiometer adjusted manually as well as with one adjusted automatically.

In accordance with the present invention, the position of the contact B along the main slide wire resistance R is accurately and precisely indicated by means of a counting train M having its actuating shaft $M'$ suitably geared to the shaft A. As shown, the actuating shaft $M'$ of the counting train M is connected to the shaft A through the shaft $a$, which, as previously explained, is connected to the shaft A by the bevel gears $a'$ and $A'$. As conventionally illustrated, the connection between the shaft $a$ and the counting train shaft $M'$ is formed by speed increasing gearing including a spur gear $a^2$ secured to the shaft $a$ and in mesh with a smaller spur gear N secured to a counter shaft $N'$. The latter also has secured to it a spur gear $N^2$ in mesh with a smaller spur gear $M^2$ secured to the actuating shaft $M'$ of the counting train M. As shown, the counting train M includes four side by side counting wheels $m'$, $m^2$, $m^3$ and $m^4$, suitably geared together. In the practical use of my invention, I contemplate the use of a counting train M, such as the ordinary reversible Veeder counter, in which each counting wheel carries at its periphery a circumferentially spaced set of members running from 0 to 9, and in which the different counting wheels are geared together so that at the end of each rotation in either direction of the counting wheel $m'$, corresponding to a corresponding complete turn of the shaft $M'$, a corresponding rotative movement of a tenth of a turn will be given to the counting wheel $m^2$; and so that at the end of each complete turn in either direction of the counting wheel $m^2$, the counting wheel $m^3$ will be given a tenth of a turn in the corresponding direction; and so that at the end of each complete turn in either direction of the counting wheel $m^3$, the counting wheel $m^4$ will be given a tenth of a turn in the corresponding direction.

As will be readily understood by those skilled in the art, the ratio of the gearing connecting the shaft A to the actuating shaft $M'$ of the counting train may be so proportioned that the numbers collectively exhibited by the different wheels of the counting train will show the changes in position of the contact B along the resistance R in suitable units. For example, if the full movement of the contact B from one end to the other of its range of movement longitudinally of the slide wire resistance R is produced by five complete turns of the shaft A, and if this movement of the contact B corresponds to a change of 2500° in the temperature to which the thermocouple T responds, then if each turn of the shaft A produces 50 turns of the shaft $M'$, the counting wheels will collectively show temperature changes in increments or units of one degree each from zero up to 2500°.

If the relation between the change in temperature, or other quantity measured, and the displacement of the contact B along the slide wire resistance R necessary to maintain the potentiometer in balance, is a straight line relation, the rotative movement of the shafts A and $M'$ should be in constant proportion, as would be the case if the arms $H'$ and $H^2$ of the yoke H were each parallel to the axis of the shaft A as they are shown in my said prior application Serial No. 322,269. In many cases, however, and as is ordinarily the case with the type of potentiometer instrument shown in Figs. 1 to 4, the relation between the changes in the quantity measured and the required compensating adjustments of the contact B, is not a straight line relation; at least throughout the full range of change and adjustment. In accordance with the present invention, any departure from a direct arithmetical proportion between the turning movements of the shaft A and $M'$ which may be necessary, may be secured by suitable mechanical provisions for effecting compensating adjustments in the mechanism by which the rotative speeds of the shafts A and $M'$ are inter-related. For example, with apparatus of the character illustrated in Figs. 1 to 4, the change in the ratio of shaft speeds ordinarily required may be easily secured by shaping the arms $H'$ and $H^2$ as shown, so that they depart from parallelism with the shaft A as required to effect the desired changes in the speed ratio of the shafts M' and A' as the contact B is moved from one limit to the other of its range of movement relative to the slide wire resistance R. As will be apparent to those skilled in the art, it is a comparatively simple and inexpensive matter to give the arms H' and H² whatever special form is found to be necessary in the initial calibration of the particular instrument or type of instrument with which they are used. In the instrument shown, the provisions including the cam H' and cam engaging part I', which make the actuation of the counting train in linear proportion to changes in the quantity measured, also make the movement of the member E relative to the scale formed by the lines on the record sheet S, in linear proportion to changes in value of said quantity. In consequence, the various scale lines on the record sheet S, are equally spaced and the values shown by the curve S' may be read from the record sheet without the necessity for any correction in the reading because of the non-linear relation between changes in the value of the quantity measured and the corresponding movement of the contact B along the potentiometer slide wire resistance.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent is:—

1. In a measuring instrument, the combination with a slide wire resistance, of a contact in engagement with, and movable relative to said slide wire, a counting train, and operating means for moving said contact relative to said resistance and actuating said counting train in correspondence with the movement of the contact relative to said resistance, said means including provisions for maintaining different proportions between the extent of counting train actuation and the extent of movement of the contact relative to the resistance, in different portions of the range of movement of said contact relative to said resistance.

2. In a measuring instrument, the combination of a slide wire resistance, a contact, a shaft rotatable to move said contact along said resistance, a counting train including an actuating shaft, and operating connections between the two shafts for causing the actuating shaft to turn in correspondence with the turning movements of the first mentioned shaft, said connections including provisions for varying the extent of movement of the actuating shaft relative to that of the first mentioned shaft in a predetermined manner as the angular position of the first mentioned shaft is varied between the limits of its angular movement.

3. In an electrical measuring instrument, the combination of a slide wire resistance, a resistance support about which the slide wire is helically wound, a contact engaging said resistance, means for moving said contact helically about the axis of said support comprising a shaft rotatably mounted in said support and an arm carried by the shaft and extending in a generally transverse direction to the line of movement of the contact and in sliding engagement with the latter, said arm being out of parallelism with said shaft whereby the relation between the rotative movements about said axis of said shaft and contact are different in different portions of the helical movement of the latter, a counting train including an actuating shaft, and gearing connecting the last mentioned shaft to the first mentioned shaft.

4. In a measuring instrument, the combination with a slide wire resistance of a contact in engagement with, and movable relative to, said slide wire, a counting train, and operating means for moving said contact relatively to said resistance and simultaneously actuating said counting train in correspondence with the movement of the contact relative to said resistance, said means including a cam and a cam engaging part for maintaining different proportions between the extent of counting train actuation and the extent of movement of the contact relative to the resistance in different portions of the range of movement of said contact relative to said resistance.

5. In a measuring instrument, the combination with a slide wire resistance of a contact in engagement with, and movable relative to, said slide wire, means for exhibiting the relative postion of said contact and resistance, and operating means for moving said contact relative to said resistance and actuating said exhibiting means in correspondence with the movement of the contact relative to said resistance, said means including provisions for maintaining different proportions between the extent of exhibiting means actuation and the extent of movement of the contact relative to the resistance, in different portions of the range of movement of said contact relative to said resistance.

6. In a measuring instrument, the slide wire resistance, a contact engaging said resistance, means for relatively adjusting the contact and resistance, means for exhibiting the relative position of the contact and resistance, a measuring circuit including said resistance and responding to a measurable quantity which varies non-linearly relative to the scale of measurement, and means for effecting a relative adjustment of the slide wire and contact to compensate for said non-linear relation so that adjustment of the first mentioned means is linearly related to variations in the measurable quantity.

Signed at New York city, in the county of New York and State of New York, this 5th day of February, A. D. 1929.

THOMAS R. HARRISON.